US011208956B2

(12) United States Patent
Ryon et al.

(10) Patent No.: US 11,208,956 B2
(45) Date of Patent: Dec. 28, 2021

(54) FUEL INJECTORS AND METHODS OF MAKING FUEL INJECTORS

(71) Applicant: Delavan Inc., West Des Moines, IA (US)

(72) Inventors: Jason A. Ryon, Carlisle, IA (US); Jacob Greenfield, Granger, IA (US)

(73) Assignee: Delavan Inc., West Des Moines, IA (US)

( * ) Notice: Subject to any disclaimer, the term of this patent is extended or adjusted under 35 U.S.C. 154(b) by 667 days.

(21) Appl. No.: 15/789,735

(22) Filed: Oct. 20, 2017

(65) Prior Publication Data

US 2019/0120141 A1   Apr. 25, 2019

(51) Int. Cl.
| | |
|---|---|
| *F02C 7/00* | (2006.01) |
| *F02C 7/232* | (2006.01) |
| *F02C 7/22* | (2006.01) |
| *F23R 3/28* | (2006.01) |
| *F16L 51/04* | (2006.01) |
| *F23D 14/48* | (2006.01) |
| *F23K 5/00* | (2006.01) |

(52) U.S. Cl.
CPC .............. *F02C 7/232* (2013.01); *F02C 7/222* (2013.01); *F16L 51/04* (2013.01); *F23D 14/48* (2013.01); *F23K 5/007* (2013.01); *F23R 3/28* (2013.01); *F23R 3/283* (2013.01); *F05D 2230/30* (2013.01); *F23D 2206/10* (2013.01); *F23D 2211/00* (2013.01); *F23R 2900/00005* (2013.01)

(58) Field of Classification Search
CPC .. F23D 2211/00; F23D 2206/10; F23D 14/48; F16L 51/04; F23R 2900/00005; F23R 3/283; F23R 3/28; F02C 7/222
See application file for complete search history.

(56) References Cited

U.S. PATENT DOCUMENTS

| | | | |
|---|---|---|---|
| 2,364,489 | A | 12/1944 | Dibb |
| 3,159,971 | A | 12/1964 | Moebius et al. |
| 6,076,356 | A | 6/2000 | Pelletier |
| 6,276,141 | B1 | 8/2001 | Pelletier |
| 7,770,602 | B2 | 8/2010 | Buschhoff |
| 8,322,004 | B2 | 12/2012 | Lewis et al. |
| 8,327,649 | B2 | 12/2012 | Bishara et al. |

(Continued)

FOREIGN PATENT DOCUMENTS

| | | |
|---|---|---|
| EP | 3171087 A1 | 5/2017 |
| GB | 06918 | 12/1909 |

OTHER PUBLICATIONS

Extended European Search Report dated Mar. 19, 2019, issued during the prosecution of European Patent Application No. EP 18201789.7 (7 pages).

*Primary Examiner* — Edwin G Kang
(74) *Attorney, Agent, or Firm* — Locke Lord LLP; Scott D. Wofsy; Joshua L. Jones

(57) ABSTRACT

A fuel conduit for a fuel injector includes a coiled tube with a longitudinal segment arranged along a flow axis and a radial segment. The radial segment extends about the flow axis and is in fluid communication with the longitudinal segment. The wall one or more of the longitudinal and radial segments increases at a thickness transition location offset from a minimum radius of curvature location along the fuel conduit to limit stress within the fuel conduit. Fuel injectors and methods of making fuel injectors are also described.

19 Claims, 7 Drawing Sheets

(56) References Cited

U.S. PATENT DOCUMENTS

| | | | |
|---|---|---|---|
| 2002/0069647 A1* | 6/2002 | Mayersky | F02C 7/222 |
| | | | 60/796 |
| 2009/0293482 A1* | 12/2009 | Davis, Jr. | F23D 14/82 |
| | | | 60/737 |
| 2015/0135716 A1 | 5/2015 | Ginessin et al. | |
| 2016/0108818 A1 | 4/2016 | Fletcher et al. | |
| 2017/0003029 A1 | 1/2017 | Mook et al. | |
| 2017/0203511 A1 | 7/2017 | Burkhart et al. | |

* cited by examiner

FUEL INJECTORS AND METHODS OF MAKING FUEL INJECTORS

BACKGROUND OF THE INVENTION

1. Field of the Invention

The present disclosure relates to fuel injectors, and more particularly to fuel injectors having coiled fuel conduits for accommodating thermal gradients during operation.

2. Description of Related Art

Gas turbine engines like those used on aircraft commonly employ fuel injectors to provide fuel to the engine combustion section. The combustion section generally includes combustors which seat the fuel injectors. The fuel injectors provide a flow of fuel to the engine combustors to generate high temperature combustion products, which the combustion section communicates to the engine turbine section. The turbine section expands the combustion products, extracting work for powering the engine compressor section and creating thrust. Once expanded, the combustion products are released into the external environment.

Since the combustion products are generally provided to the turbine section at high temperature, and the fuel provided to the fuel injectors is cold in comparison to the high temperature combustion products, considerable thermal stresses can be present in certain fuel injector structures. In some gas turbine engines the thermal stress can be such that stress relief devices are necessary within the fuel injector. The stress relief devices are typically flexible, allowing structures containing relatively cool fuel to remain fixed relative to structures exposed to heat sufficient to cause geometry change. Such stress relief devices can add complexity, cost and/or time to the manufacture of the fuel injector.

Such conventional methods and systems have generally been considered satisfactory for their intended purpose. However, there is still a need in the art for improved fuel injectors and methods of making fuel injectors. The present disclosure provides a solution for this need.

SUMMARY OF THE INVENTION

A fuel conduit for a fuel injector includes a coiled tube having longitudinal segment arranged along a flow axis and a radial segment. The radial segment extends about the flow axis and is in fluid communication with the longitudinal segment. The wall of one or more of the longitudinal and radial segments increases at a thickness transition location offset from a minimum radius of curvature location along the fuel conduit to limit stress within the fuel conduit.

In certain embodiments, a fuel nozzle can be disposed in fluid communication with the longitudinal segment through the radial segment. A fuel nozzle can be disposed in fluid communication with the radial segment through the longitudinal segment. The transition location can be defined along the longitudinal segment. The transition location can be defined along the radial segment. The transition location can be defined at an adapter coupled to the radial segment.

In accordance with certain embodiments, the location of the minimum radius of curvature can have wall thickness greater than that of the radial segment. The location of the minimum radius of curvature can have wall thickness greater than that of the longitudinal segment. The location of the minimum radius of curvature can be defined along an adapter coupling the radial segment to the longitudinal segment. A braze layer can couple the adapter to the radial segment and the longitudinal segment of the fuel conduit. It is contemplated that the transition location can be a first transition location disposed along the radial segment and that a second transition location can be disposed along the longitudinal segment.

It is also contemplated that, in accordance with certain embodiments, the fuel conduit can include a continuous length of tubing. The continuous length of tubing can define the radial and longitudinal segments. The transition location can be arranged along the continuous length of tubing. The transition location can include a first layer and one or more second layers fused to the first layer. The layers can include a common material with intervening dissimilar materials.

A fuel injector for a gas turbine engine includes a feed arm with a fuel inlet, a fuel conduit as described above coupled to the feed arm and in fluid communication with the fuel inlet, and a fuel nozzle in fluid communication with the fuel inlet through the fuel conduit. The fuel conduit has first and second thickness transition locations, the location of the minimum radius of curvature located between the first and second thickness transition locations, wall thickness increasing between each of the first and second thickness transition locations and the location of the minimum radius of curvature.

A method of making a fuel conduit for a fuel injector includes forming a longitudinal segment defining a flow axis and forming a radial segment extending about the flow axis and in fluid communication with the longitudinal segment. A thickness transition location and a minimum radius of curvature location are defined along the either or both the longitudinal and radial segments, the location of the minimum radius of curvature being offset from the thickness transition location, and wall thickness of the fuel conduit increasing between the thickness transition location and the minimum radius of curvature location.

In certain embodiments the longitudinal segment can be coupled to the radial segment with an adapter. A continuous tube length having a tapered wall thickness segment can be bent to form the longitudinal and radial segments. One or more second layers can be fused to a first layer to thicken the wall at the minimum radius of curvature location.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
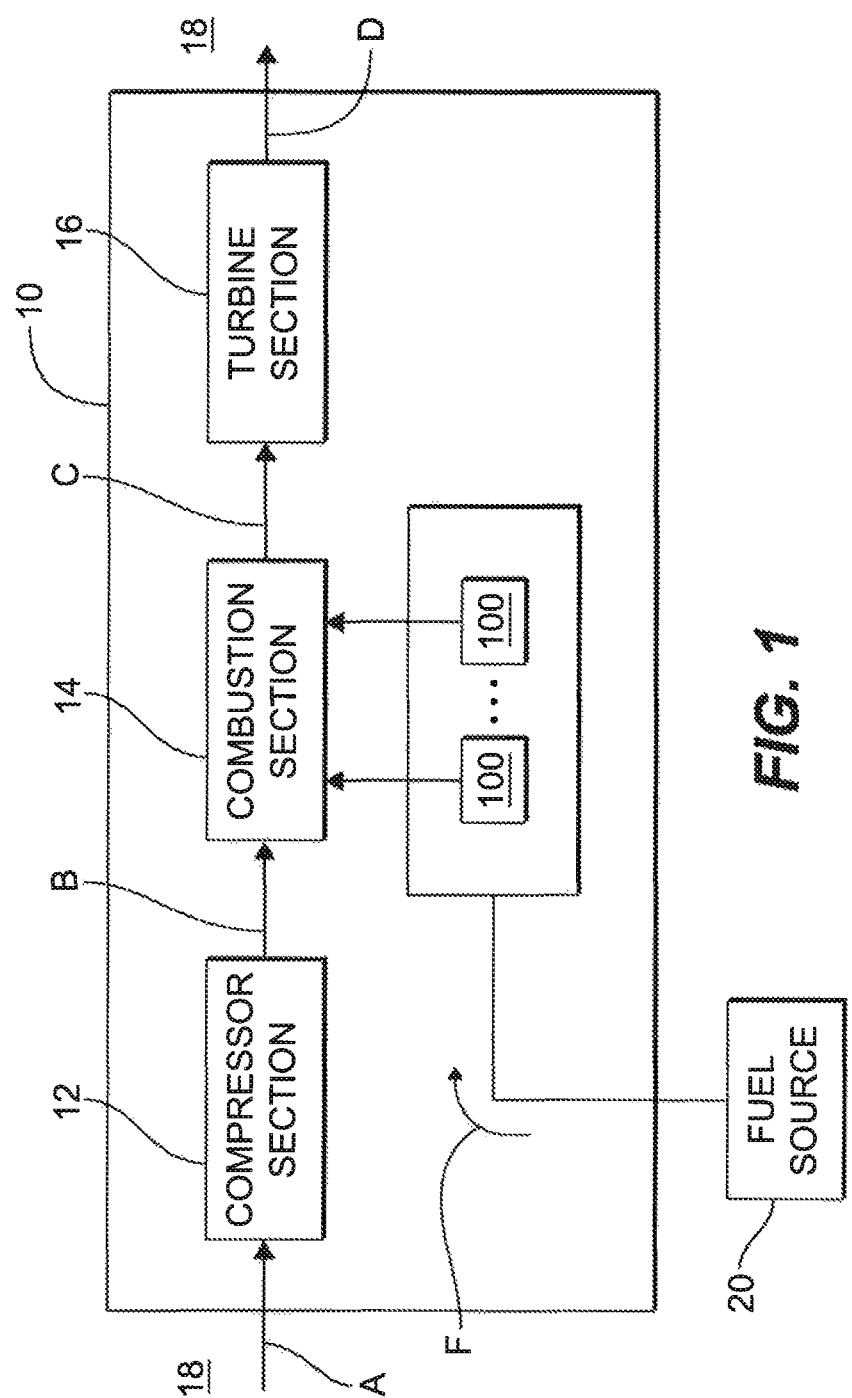
FIG. 1 is a schematic view of an exemplary embodiment of a gas turbine engine constructed in accordance with the present disclosure, showing a fuel injector in fluid communication with the combustion section of the gas turbine engine.

Reference will now be made to the drawings wherein like reference numerals identify similar structural features or aspects of the subject disclosure. For purposes of explanation and illustration, and not limitation, a partial view of an exemplary embodiment of a fuel injector in accordance with the disclosure is shown in FIG. 1 and is designated generally by reference character 100. Other embodiments of fuel injectors, fuel conduits for fuel injectors, and methods of making fuel injectors for gas turbine engines in accordance with the disclosure, or aspects thereof, are provided in FIGS. 2-10, as will be described. The systems and methods described herein can be used for fuel injectors in gas turbine engines, such as in aircraft main engines and auxiliary power units, though the present disclosure is not limited to aircraft or to fuel injectors in general.

Referring to FIG. 1, a gas turbine engine 10 is shown. Gas turbine engine 10 includes a compressor section 12, a combustion section 14, a turbine section 16, and one or more fuel injector 100. Compressor section 12 is in fluid communication with the external environment 18 and combustion section 14. Combustion section 14 is in fluid communication with compressor section 12 and turbine section 16. Turbine section 16 is in fluid communication with combustion section 14 and external environment 18. Fuel injector 100 is in fluid communication with a fuel source 20 and receives a flow of fuel F from fuel source 20.

Compressor section 12 is arranged to ingest fluid A from external environment 18 and compress fluid A into a compressed fluid flow B. Compressor section 12 communicates fluid flow B to combustion section 14, which receives a fuel flow F from fuel injector 100 and generates a combustion product flow C. Combustion section 14 communicates flow C to turbine section 16, which expands flow C to extract work and/or generate thrust from flow C. Turbine section 16 thereafter communicates an expanded combustion product flow D to external environment 18.

Fuel flow F is relatively cool in comparison to the engine structure surrounding fuel injector 100. In some gas turbine engines the temperature can be such that heat shielding or other countermeasures are required to compensate for the relatively large thermal stresses that can be present within the fuel injector structure. One such countermeasure incorporated in fuel injector 100 is a coiled tube 126 (shown in FIG. 2), which provides a flexible, fluid-carrying structure capable of tolerating relatively large thermal gradients without fracturing due to the ability of coiled tube 126 to lengthen between a nominal longitudinal length and thermally distorted longitudinal length in response to heating of fuel injector 100.

As will be appreciated by those of skill in the art in view of the present disclosure, coiled tube portions of fuel conduits such as coiled tube 126 (shown in FIG. 2) can increase the expected service life of a fuel injectors sufficiently to offset the complexity, expense, and additional lead time that typically accompanies incorporation of coiled tube portion 101 in fuel injector 100. However, as will also be appreciated by those of skill in the art in view of the present disclosure, the cyclic application of stress over course of service is cumulative—potentially leading to fracture of the fuel conduit or replacement of the fuel injector at some service interval. Applicant has observed that the fatigue-relative fractures typically occur around locations of fuel conduit curvature, and therefore proposes to thicken wall thickness of fuel conduit at the location of minimum radius of curvature to reduce stress and further increase the service life of fuel injector 100.

Figure 2:
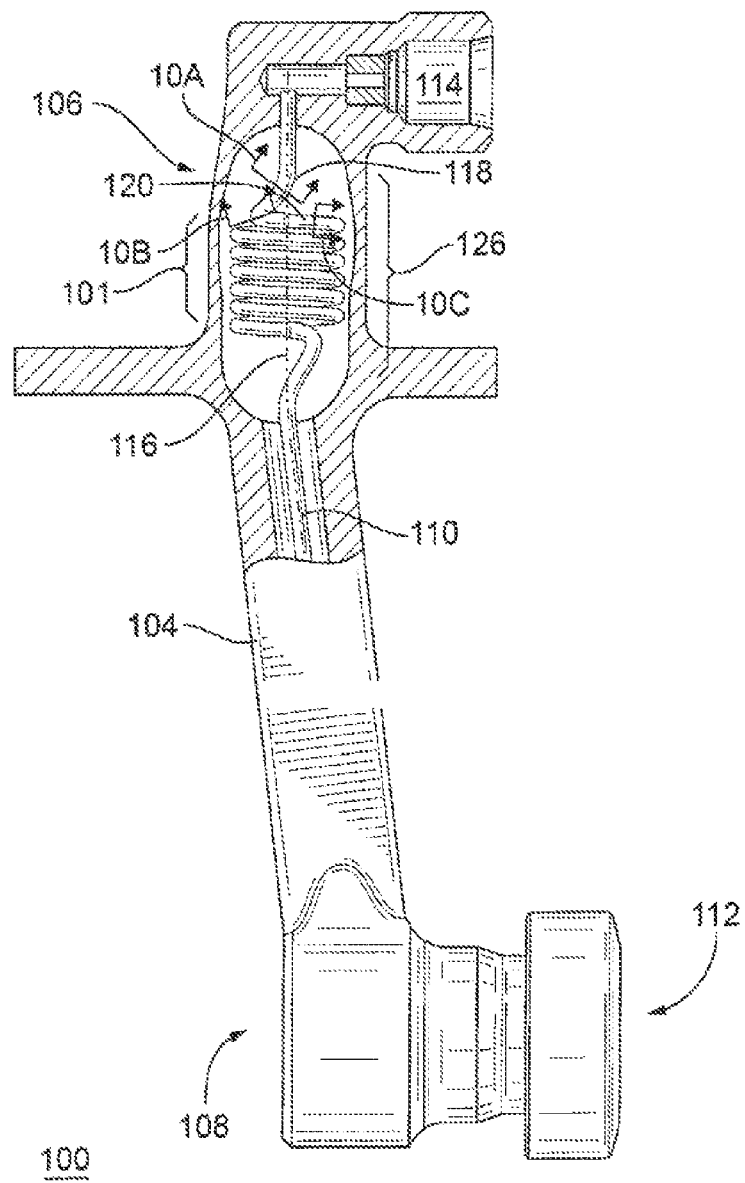
FIG. 2 is a cross-sectional side view of the fuel injector of FIG. 1, showing fuel conduit having a longitudinal segment and a radial segment.

With reference to FIG. 2, fuel injector 100 is shown. Fuel injector 100 includes a feed arm 104 with an inlet end 106 and an outlet end 108, a fuel conduit 110, and a nozzle 112. A fuel inlet 114 is defined on inlet end 106 and is arranged for receiving fuel from fuel source 20 (shown in FIG. 1). Fuel conduit 110 is coupled to feed arm 104, e.g. at longitudinally opposite ends thereof, and is in fluid communication with both fuel inlet 114 and nozzle 112. Nozzle 112 is supported within outlet end 108 of feed arm 104 and is in fluid communication with fuel inlet 114 through fuel conduit 110.

Fuel conduit 110 includes coiled tube 126, is arranged along a flow axis 116, defines a flow channel 102 (shown in FIG. 4) therein, and has a longitudinal segment 118 and a radial segment 120 forming coiled tube 126. Flow axis 116 extends along the longitudinal length of feed arm 104 between inlet end 106 and outlet end 108 of feed arm 104. Longitudinal segment 118 extends substantially along flow axis 116. Radial segment 120 is coupled (or connected) to longitudinal segment 118 and extends radially about flow axis 116.

Fuel nozzle 112 is disposed in fluid communication with longitudinal segment 118 through radial segment 120. Fuel source 20 (shown in FIG. 1) is disposed in fluid communication with radial segment 120 through longitudinal segment 118. As used herein the term "radial segment" refers to a fuel conduit segment having a ratio of lateral travel (relative to a flow axis) to longitudinal travel (relative to the flow axis) that is greater than or equal to one. As used herein the term "longitudinal segment" refers to a fuel conduit segment having a ratio of lateral travel (relative to the flow axis) to longitudinal travel (relative to the flow axis) that is less than one. As used herein the term "minimum radius of curvature location" refers to the location where the rate of change in direction of the flow axis is the greatest between a fluidly coupled longitudinal segment and radial segment.

Radial segment 120 forms a portion of a coiled tube 126. Coiled tube portion 101 of coiled tube 126 is arranged to accommodate, through distortion, thermally driven geometry change in due injector 100. For example, coiled tube portion 101 can increase in length or decrease in length relative to a nominal longitudinal length along flow axis 116 in response to thermal heating of fuel injector 100. As will be appreciated by those of skill in the art in view of the present disclosure, lengthening or shortening of coiled tube portion 101 loads fuel conduit 110 in tension or compression, exerting stress within coiled tube portion 101. As will also be appreciated by those of skill in view of the present disclosure, the magnitude of associated stress is a function of the load, wall thickness, and local curvature of fuel conduit 110.

Figure 3:
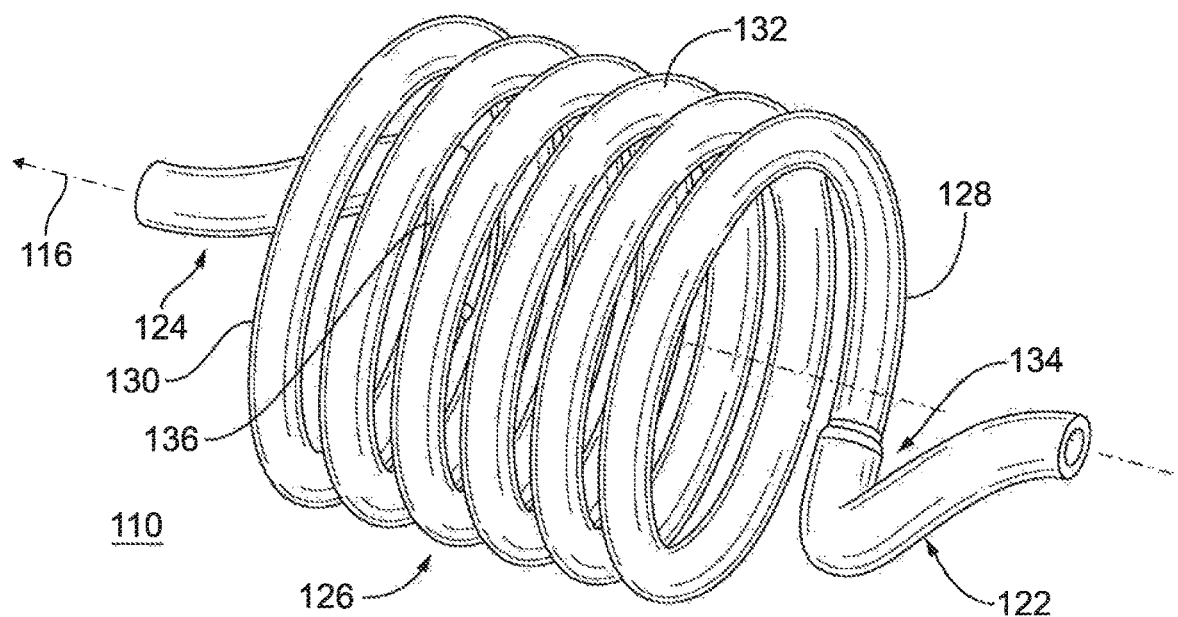
FIGS. 3 and 4 are perspective and cross-sectional views of the fuel injector of FIG. 1 according to an exemplary embodiment, showing a fuel conduit with thickened walls at locations of minimum radii of curvature on opposite ends of a coiled tube.
Figure 4:
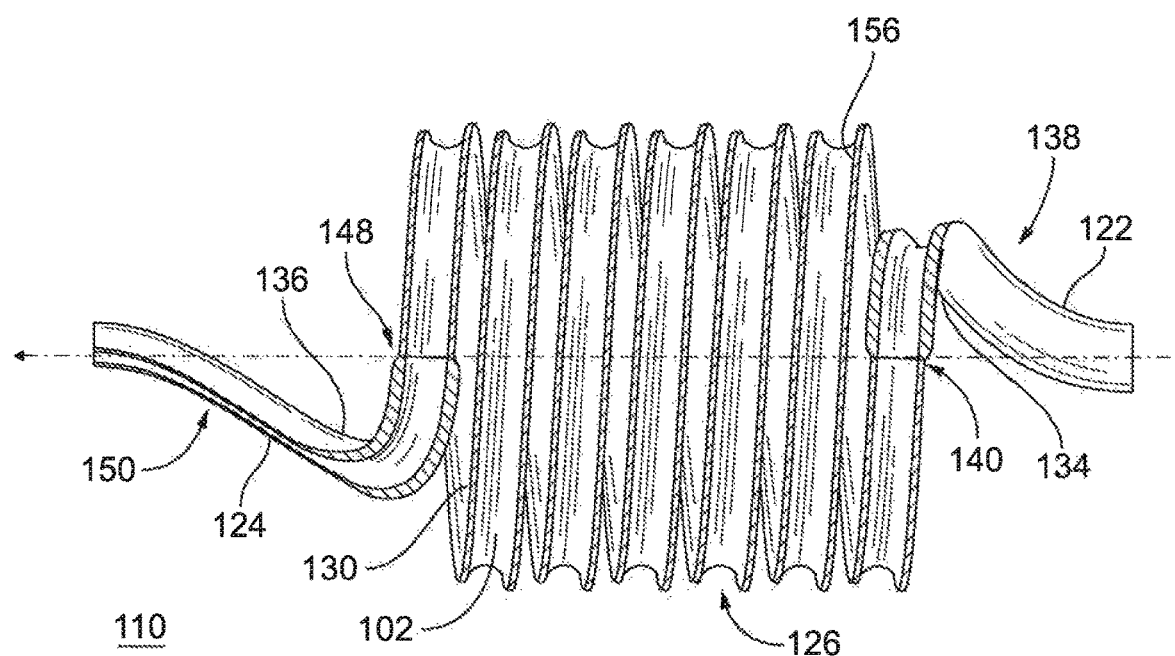

With reference to FIGS. 3 and 4, fuel conduit 110 is shown according to first exemplary embodiment. Fuel conduit 110 includes an inlet longitudinal segment 122, an outlet longitudinal segment 124, and coiled tube 126. Inlet longitudinal segment 122 and outlet longitudinal segment 124 are arranged along a flow axis 116 and are coupled to one another by coiled tube 126. Coiled tube 126 has a plurality of radial segments include an inlet radial segment 128, an outlet radial segment 130, and at least one intermediate radial segment 132 that each extend about flow axis 116.

Inlet longitudinal segment 122 is connected to fuel inlet 114 (shown in FIG. 2) and therethrough with fuel source 20 (shown in FIG. 1). Inlet radial segment 128 is connected to inlet longitudinal segment 122 and is in fluid communication therethrough with fuel inlet 114. The at least one intermediate radial segment 132 is connected to inlet radial segment 128 and is in fluid communication therethrough with inlet longitudinal segment 122. Outlet radial segment 130 is connected to the at least one intermediate radial segment 132 and is in fluid communication therethrough with inlet radial segment 128. Outlet longitudinal segment 124 is connected to outlet radial segment 130 and is in fluid communication therethrough with the at least one intermediate radial segment 132. Nozzle 112 (shown in FIG. 2) is connected to outlet longitudinal segment 124 and is therethrough in fluid communication with fuel source 20.

Fuel conduit has a first minimum radius of curvature location 134 and second minimum radius of curvature location 136 (shown in FIG. 4). First minimum radius of curvature location 134 is defined at an intersection of inlet longitudinal segment 118 and inlet radial segment 128. Second minimum radius of curvature location 136 is defined at an intersection of outlet radial segment 130 and outlet longitudinal segment 124. This is for illustration purposes only and is non-limiting. It is contemplated that either (or both) of first minimum radius of curvature location 134 and second minimum radius of curvature location 136 can be located along inlet longitudinal segment 122 and/or outlet longitudinal segment 124. It is also contemplated that either (or both) of first minimum radius of curvature location 134 and second minimum radius of curvature location 136 can be located along inlet radial segment 128 and/or outlet radial segment 130, as suitable for an intended application.

Referring to FIGS. 3 and 4, either (or both) of inlet longitudinal segment 122 and inlet radial segment 128 have a thickness transition location. In the exemplary embodiment, as shown in FIG. 4, both inlet longitudinal segment 122 and inlet radial segment 128 have thickness transition locations. In this respect inlet longitudinal segment 122 has a first thickness transition location 138 (shown in FIG. 4) defined between first minimum radius of curvature location 134 and fuel inlet 114 (shown in FIG. 2), and inlet radial segment 128 has a second thickness transition location 140 (shown in FIG. 4) defined between intermediate radial segment 132 and first minimum radius of curvature location 134. Outlet longitudinal segment 124 also a first thickness transition location 150 (shown in FIG. 4) defined between first minimum radius of curvature location 136 and fuel nozzle 112 (shown in FIG. 2), and outlet radial segment 130 has a second thickness transition location 150 (shown in FIG. 4) defined between intermediate radial segment 132 and second minimum radius of curvature location 136.

Wall thickness of inlet longitudinal segment 122 increases in the direction of fluid flow through fluid channel 102 from first thickness transition location 138 to first minimum radius of curvature location 134. Wall thickness of inlet radial segment 128 similarly increases in a direction opposite the direction of fluid flow through fluid channel 102 from second thickness transition location 140 to first minimum radius of curvature location 134. It is contemplated that the wall thickness can increase from a relatively small longitudinal segment wall thickness 151 (shown in FIG. 10A) to a relatively large thick wall thickness 153 (shown in FIG. 10B), and thereafter decrease to a relative small radial segment wall thickness 155 (shown in FIG. 10C). As will also appreciated by those of skill in the art in view of the present disclosure, change in wall thickness at inlet end 122 can reduce stress in fuel conduit 110 first minimum radius of curvature location 134, improving reliability while retaining flexibility in coiled tube 126 to accommodate thermal expansion and contraction.

In certain embodiments wall thickness of outlet radial segment 130 can increase in the direction of fluid flow through fluid channel 102 from first thickness transition location 148 to second minimum radius of curvature location 136. Wall thickness can thereafter decrease from second minimum radius of curvature location 136 to second transition location 150. As above, it is contemplated that the wall thickness can increase from a relatively small longitudinal segment wall thickness 151 (shown in FIG. 10A) at first thickness transition location to a relatively large thick wall thickness 153 (shown in FIG. 10B) at second minimum radius of curvature location 136, and thereafter decrease to a relatively small radial segment wall thickness 155 (shown in FIG. 10C) at second transition location 150. As will also appreciated by those of skill in the art in view of the present disclosure, change in wall thickness at end 124 can further reduce stress in fuel conduit 102 at second location of minimum radius of curvature 136, further improving reliability, while retaining the flexibility to accommodate thermal expansion and contraction by allowing coiled tube 126 to remain pliable.

Figure 10A:
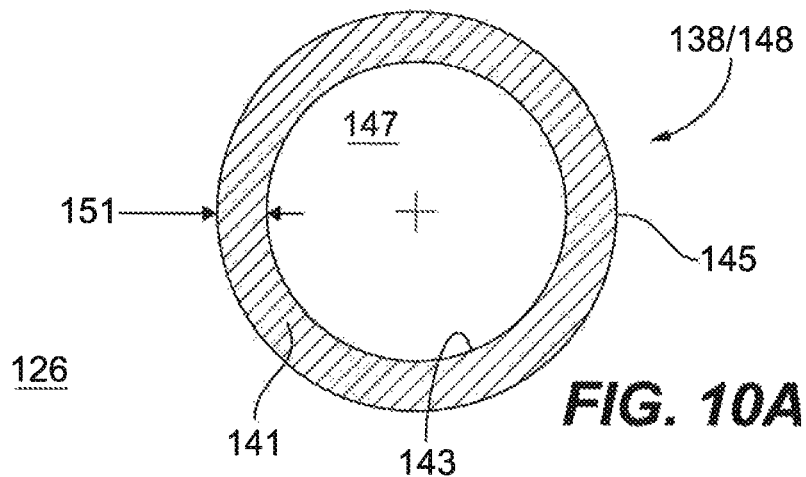
FIGS. 10A-10C are exemplary cross-sections of fuel conduits constructed in accordance with the present disclosure, showing thickened cross-sectional areas at minimum bend radii.
Figure 10B:
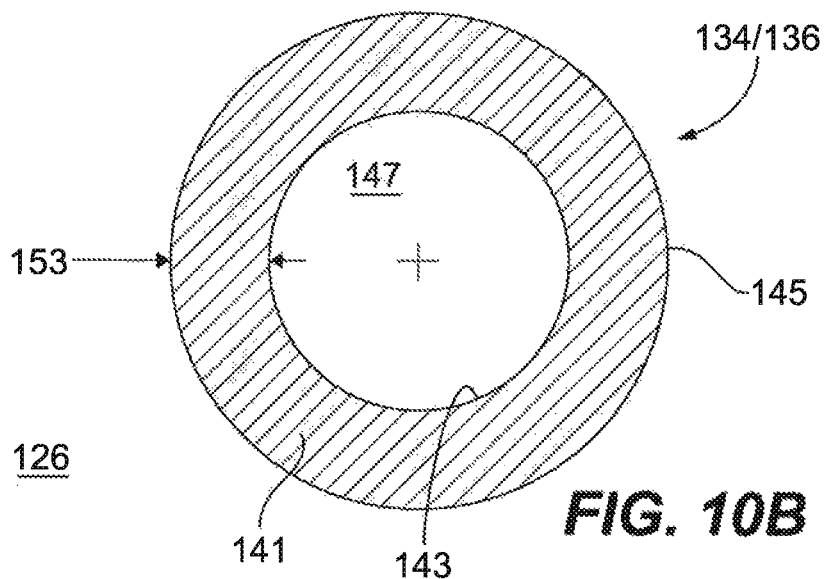
Figure 10C:
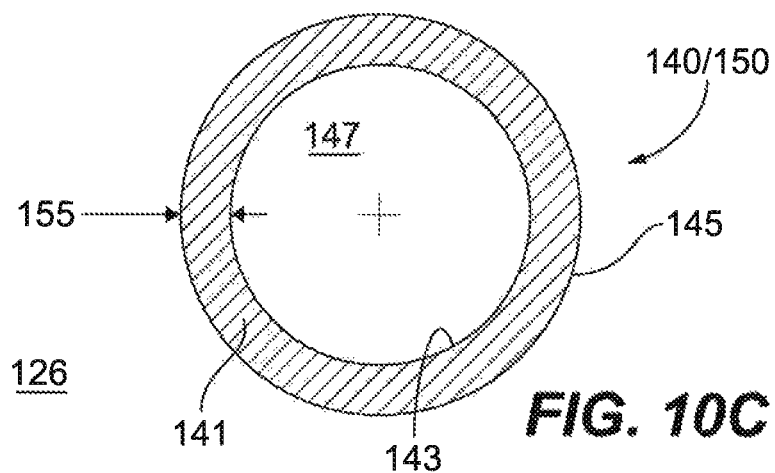

With reference to FIGS. 10A-10C, fuel coil 126 is shown. Fuel coil 126 has a generally tubular shape and includes a tubular wall 141 with an interior surface 143 and an exterior surface 145. Interior surface 143 bounds a flow area 147. Wall thickness of tubular wall 141, e.g., wall thickness 151 (shown in FIG. 10A), wall thickness 153 (shown in FIG. 10B), and wall thickness 155 (shown in FIG. 10C), is defined between interior surface 143 and exterior surface 145. It is contemplated flow area 147 not be diminished at portions to fuel coil 126 having thicker wall thickness, e.g., at minimum radius of curvature locations bounded by wall thickness 153.

Either (or both) of outlet radial segment 130 and outlet longitudinal segment 124 have a thickness transition location. In the exemplary embodiment both outlet radial segment 130 and outlet longitudinal segment 124 have thickness transition locations. In this respect outlet radial segment 130 has a first thickness transition location 148 defined between second minimum radius of curvature location 136 and the at least one intermediate radial segment 132, and outlet longitudinal segment 124 has a second thickness transition location 150 second minimum radius of curvature location 136 and nozzle 112 (shown in FIG. 2).

It is contemplated that thickness change between inlet end first thickness transition location 138 and second thickness transition location 140 change according to a wall thickness taper of a continuous length of tube defining each of inlet longitudinal segment 122 and inlet radial segment 128. It is also contemplated that thickness change between outlet end first thickness transition location 148 and second transition location 150 according to a wall thickness taper of a continuous length of tube defining each of outlet radial segment 130 and outlet longitudinal segment 124. For example, in the illustrated exemplary embodiment, a single continuous length of tube stock 156 having a wall turned down selectively along its length prior to bending tube stock 156 to form coiled tube 126 be used to form coiled tube 126.

Figure 5:
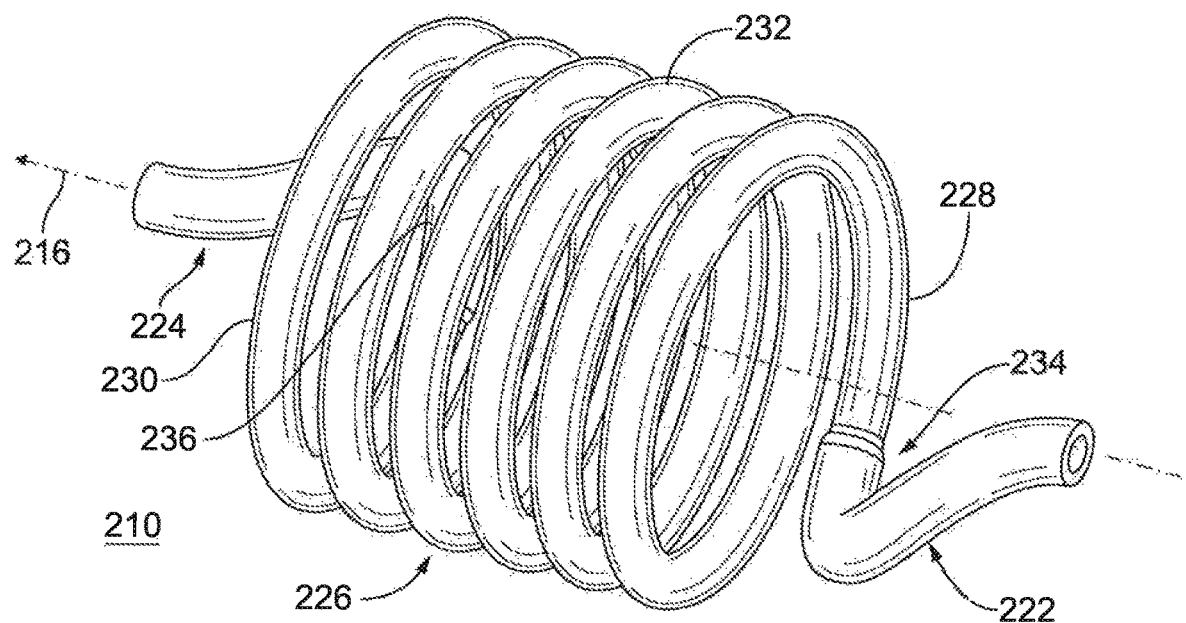
FIGS. 5 and 6 are perspective and cross-sectional views of the fuel injector of FIG. 1 according to another exemplary embodiment, showing a fuel conduit with fused layers and thickened walls at locations of minimum radii of curvature on opposite ends of a coiled tube.
Figure 6:
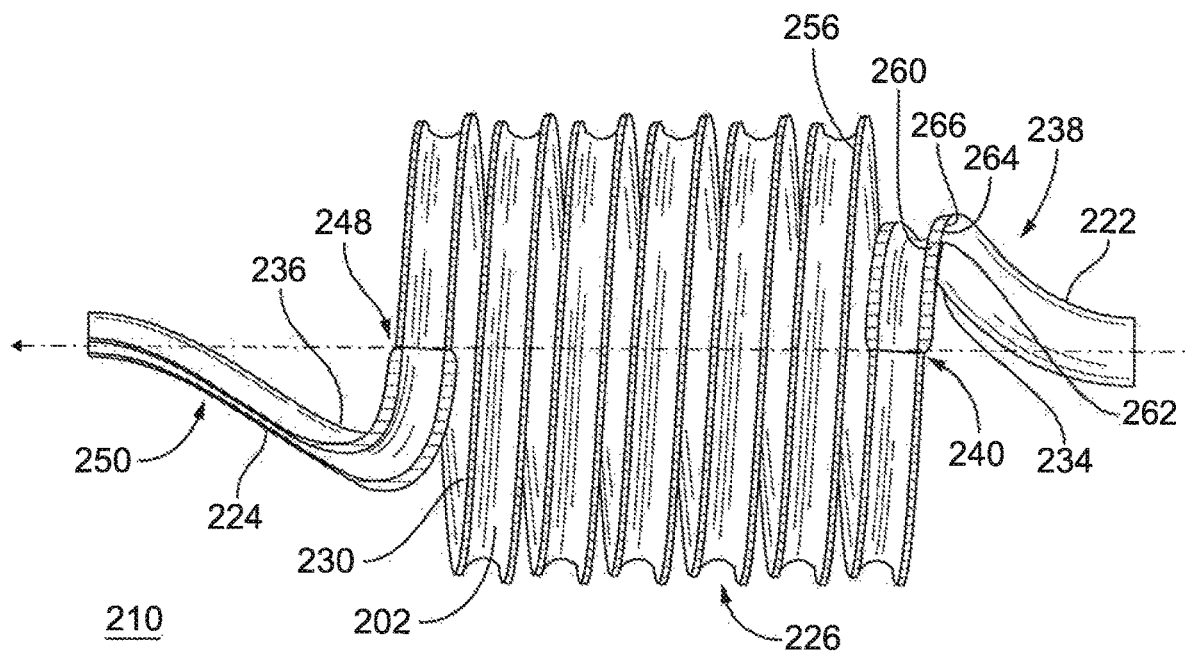

With reference to FIGS. 5 and 6, fuel conduit 210 according to a second exemplary embodiment is shown. Fuel conduit 210 is similar to fuel conduit 110 (shown in FIG. 2) and additionally includes a first layer 260 and one or more second layers 262. The one or more second layers are fused to first layer 260, such as in an additive manufacturing technique, to fuel conduit 210 between the thickness transition locations defined on opposite ends of fuel conduit 210. It is contemplated that first layer 260 and second layer 262 be formed from a common material, such as a nickel steel alloy, with no dissimilar material disposed between first layer 260 and second layer 262. In the exemplary embodiment shown in FIG. 6, both ends of fuel conduit 210 includes a plurality of fused layers, a second layer 262 being fused to first layer 260 between inlet end first thickness transition location 234 and inlet end second thickness transition location 240, and a third layer 264 being fused to a fourth layer 266 between outlet end first thickness transition location 248 and outlet end second thickness transition location 250.

Figure 7:
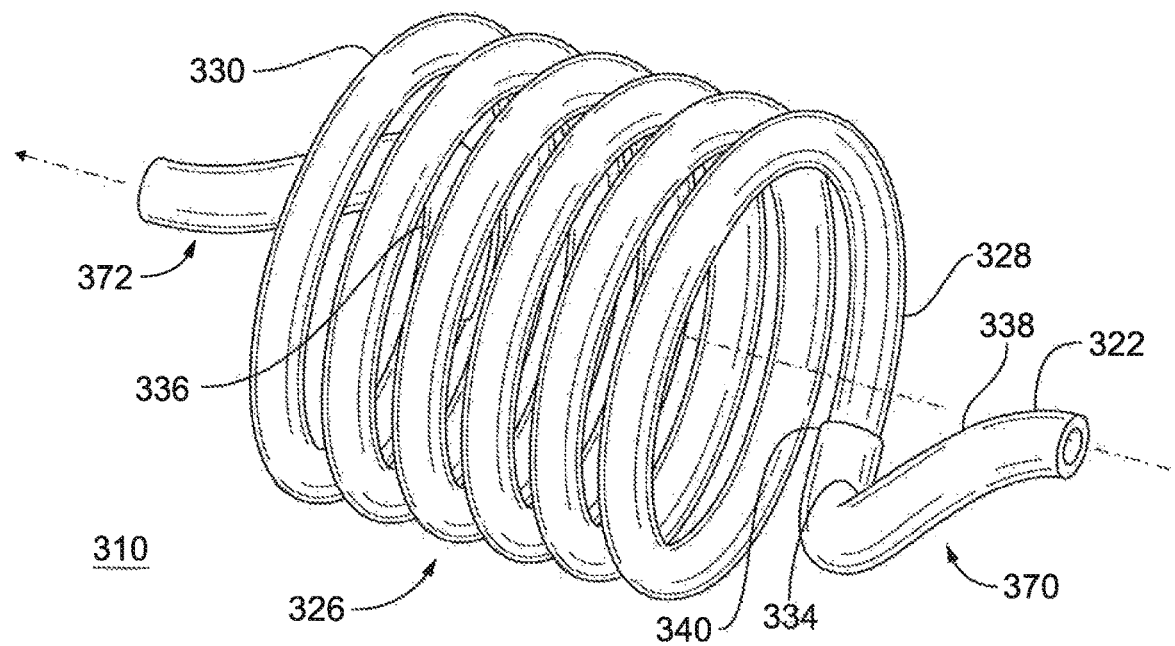
FIGS. 7 and 8 are perspective and cross-sectional views of the fuel injector of FIG. 1 according to a further exemplary embodiment, showing a fuel conduit having adapters coupled to opposite ends of a coiled tube with thickened walls at locations of minimum radii of curvature.
Figure 8:
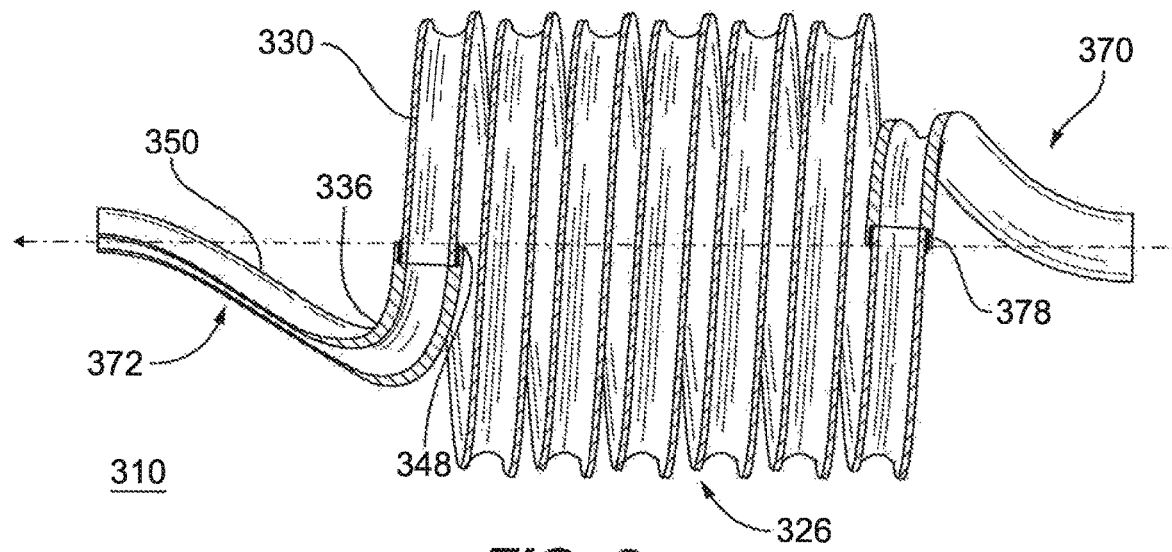

With reference to FIGS. 7 and 8, fuel conduit 310 according to a third exemplary embodiment is shown. Fuel conduit 310 is similar to fuel conduit 110 and additionally includes an inlet adaptor 370 and an outlet adapter 372. Inlet adapter 370 is connected inlet radial segment 328 and defines inlet longitudinal segment 322 and first minimum radius of curvature location 334. First thickness transition location 338 is arranged on an end of inlet adapter 370 on a side of first minimum radius of curvature location 334 opposite coiled tube 326. Second thickness transition location 340 is arranged on end of inlet adapter 370 adjacent to, and receiving at least a portion of, inlet radial segment 328. As shown in FIG. 8, a dissimilar material 374 can couple inlet adapter 370 to inlet radial segment 328, such as solder or braze. It is also contemplated that inlet adapter 370 can be welded to coiled tube 326.

With continuing reference to FIG. 7, outlet adapter 372 is connected outlet radial segment 330 and defines outlet longitudinal segment 324 and second minimum radius of curvature location 336 (shown in FIG. 8). As shown in FIG. 8, outlet end first thickness transition location 348 is arranged on an end of outlet adapter 372 adjacent to, and receiving at least a portion of, coiled tube 326. Outlet end second thickness transition location 350 is arranged on (or along) end of outlet adapter 372 and adjacent to inlet radial segment 328. It is also contemplated that dissimilar material 374 can also couple outlet adapter 370 to outlet radial segment 330. In certain embodiments outlet adapter 372 can be welded to coiled tube 326.

Figure 9:
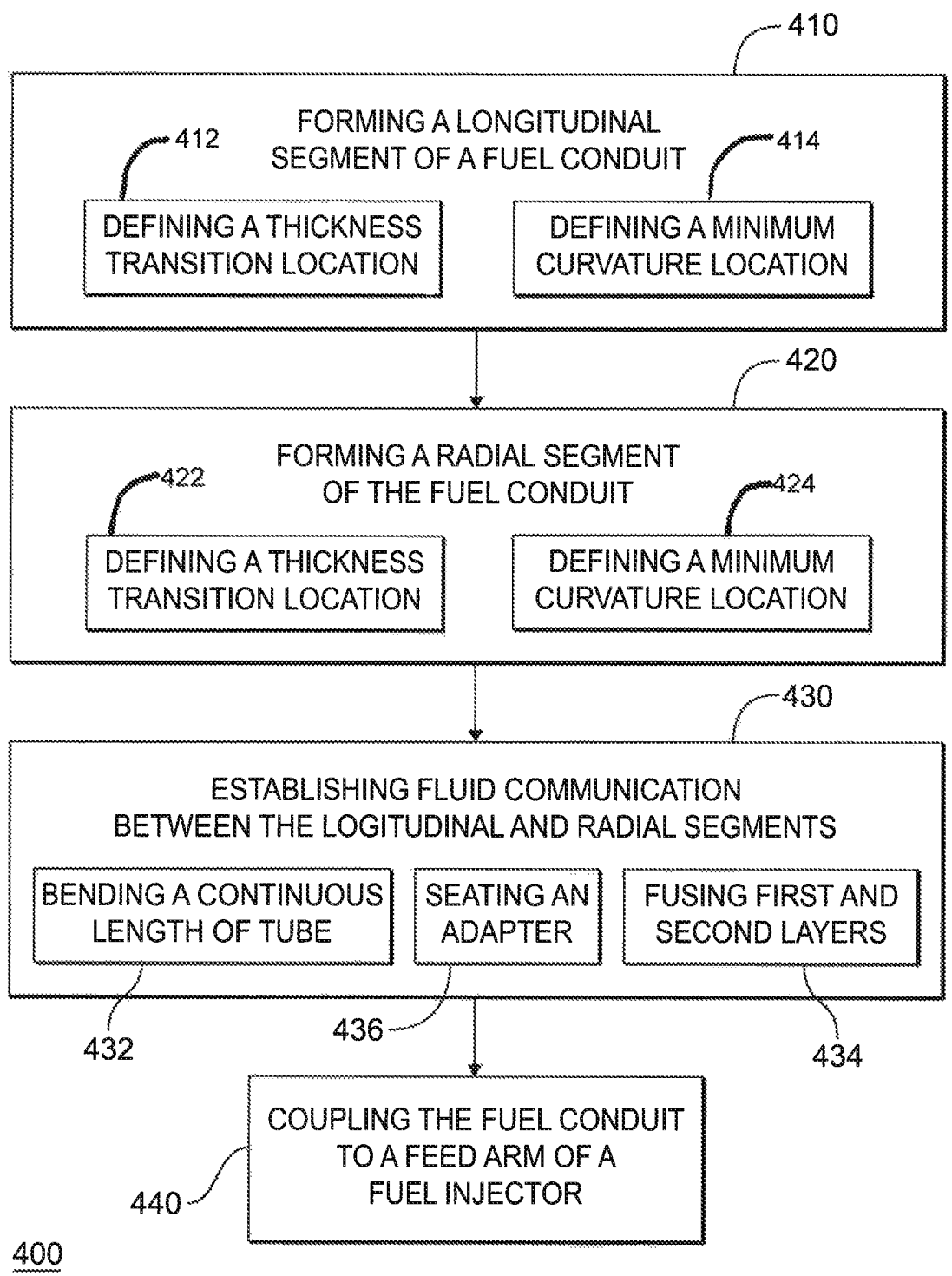
FIG. 9 is a block diagram of an exemplary method of making a fuel injector for a gas turbine engine, showing steps of the method.

With reference to FIG. 9, a method 400 of making a fuel conduit for a fuel injector, e.g., fuel injector 100 (shown in FIG. 1), is shown. Method 400 includes forming a longitudinal segment, e.g., inlet longitudinal segment 122 (shown in FIG. 3), as shown with box 410. Method 400 also includes forming a radial segment, e.g., inlet radial segment 128 (shown in FIG. 3), as shown with box 420. The longitudinal segment is arranged along a fuel injector flow axis, e.g., flow axis 116 (shown in FIG. 2), and the radial segment extends about the flow axis. A thickness transition location is defined on either (or both) the longitudinal segment and radial segment, as shown with boxes 412 and 422. A minimum radius of curvature location is defined along either longitudinal segment or the radial segment, as shown with boxes 422 and 424.

Fluid communication is established between the longitudinal segment and the radial segment, as shown with box 430. Fluid communication can be established between the longitudinal segment and the radial segment, for example, by forming the longitudinal segment and the radial segment from a common length of tube, e.g., common length of tube (shown in FIG. 3), as shown with box 432. Fluid communication can be established between the longitudinal segment and the radial segment by one fusing a plurality of layers to one another, e.g., first layer 260 (shown in FIG. 6) and second layer 262 (shown in FIG. 6), as shown with box 434. Fluid communication can be established between the longitudinal segment and the radial segment by seating an adapter, e.g., inlet adapter 370 (shown in FIG. 7), to the radial segment, as shown with box 436. The fuel conduit is thereafter coupled within a feed arm, e.g., feed arm 104 (shown in FIG. 2), of the fuel injector, as shown with box 440.

Some fuel injectors include fuel conduits with coils to address geometry change that can occur between the fuel conduit, which carries relatively cool fuel, and the feed arm, which can be relatively hot due to its proximity to combustion. The coil compensates for the temperature gradient by elongating and shortening relative to a nominal length according to increase and decrease of the temperature gradient within the fuel injector.

While generally satisfactory for its intended purpose, the bending process for forming the coil can be difficult to reproduce accurately, potentially leading to high development costs, high piece part costs and/or long lead times. It can also be difficult to bend relatively tight coils, i.e. coils having a small diameter and longitudinally spaced apart by small distances along the axis of the coil section, without kinking, the coil and associated housing there having to be larger and more massive than otherwise necessary to house the coil. Further, in addition to the diameter of the coil, a minimum length of the coiled tube is necessary to accommodate the deformation without breaking. In addition, bending process used to form the coil can itself pre-stress the coil structure by cold-working the material forming the coil. Moreover, kinks can form in the tube during the bending process, particularly at the inlet and outlet of the coil, potentially reducing the strength and service life of the fuel conduit as well as adding variability to the pressure drop within the fuel channel within the fuel conduit, requiring calibration of the fuel injector prior to use.

In embodiments described herein fuel conduits have selectively positioned reinforcement along the coiled tube. In certain embodiments, wall thickness of the fuel conduit is increased at locations maximum bend radius, i.e., locations of minimum radius of curvature, along the coiled tube of the fuel conduit to reduce stress at minimum radius of curvature locations, improving the fatigue life of the fuel conduit. In accordance with certain embodiments, thickness at minimum radius of curvature locations at both the inlet and outlet of the coiled tube (i.e. along longitudinal and/or radial segments of the coiled tube) is increased relative to the thickness of the coil spiral, allowing the coiled tube to remain flexible and compliant to thermal stresses while reducing stress in regions (i.e. portions of the coiled tube in proximity to the minimum radius of curvature location) otherwise vulnerable to kinking. It is contemplated that fuel conduits with selective reinforcement can be formed from continuous length of tube, with adapters having the minimum radius of curvature location defined along the length of the adapter, or using additive manufacturing techniques such as powder bed fusion by way of non-limiting example. With respect to additive manufacturing techniques in general, in addition to the capability to form relative complex geometries, fuel conduits with coiled tubes can be formed with reduced pre-stress, without kinks, and with tighter coil diameters than are typically possible using conventional coil fabrication techniques.

The methods and systems of the present disclosure, as described above and shown in the drawings, provide for fuel injectors with superior properties including improved reliability and/or service life. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel conduit for a fuel injector, comprising:
   a coiled tube, having:
      a longitudinal segment arranged to extend along a flow axis; and
      a coil segment in fluid communication with the longitudinal segment, the coil segment coiled about the flow axis,
      wherein the coil segment has a plurality of radial segments, including an inlet radial segment, an outlet radial segment, and at least one intermediate radial segment, that each extend about the flow axis,
      wherein a wall thickness of at least one of the longitudinal segment and the coil segment increases at a thickness transition location offset from a minimum radius of curvature location defined along the fuel conduit to limit stress in the fuel conduit,
      wherein the minimum radius of curvature location has a wall thickness that is greater than the wall thickness of the coil segment, the minimum radius of curvature location being a location where a rate of change in a direction of the flow axis is the greatest between the longitudinal segment and coil segment, and
      wherein the flow axis extends parallel along a longitudinal direction of a central axis of at least one coil of the coil segment.

2. The fuel conduit as recited in claim 1, wherein the thickness transition location is defined along the longitudinal segment, the longitudinal segment having a ratio of lateral travel relative to the flow axis to longitudinal travel relative to the flow axis that is less than one.

3. The fuel conduit as recited in claim 1, wherein the thickness transition location is defined along the coil segment, the coil segment having a ratio of lateral travel relative to the flow axis to longitudinal travel relative to the flow axis that is greater than or equal to one.

4. The fuel conduit as recited in claim 1, wherein the thickness transition location is defined at an adapter coupled to the coil segment.

5. The fuel conduit as recited in claim 1, wherein the wall thickness of the minimum radius of curvature location is greater than the wall thickness of the longitudinal segment.

6. The fuel conduit as recited in claim 1, further comprising an adapter coupling the coil and longitudinal segments, the minimum radius of curvature location being defined along the flow axis within the adapter.

7. The fuel conduit as recited in claim 6, further comprising a braze layer coupling the adapter to the coil segment and the longitudinal segment.

8. The fuel conduit as recited in claim 1, wherein the fuel conduit comprises a continuous tubing length with a tapered wall thickness defining the coil segment and the longitudinal segment, the thickness transition location arranged along the continuous tubing length.

9. The fuel conduit as recited in claim 1, further comprising a fuel nozzle disposed in fluid communication with the longitudinal segment through the coil segment.

10. The fuel conduit as recited in claim 1, wherein the coiled tube includes the coil segment formed from a tubular wall, the tubular wall having a wall thickness defined between interior and exterior surfaces of the tubular wall.

11. The fuel conduit as recited in claim 1, wherein the transition location comprises a first layer and at least one second layer fused to the first layer, the at least one second layer and the first layer comprising a common material with no dissimilar material disposed between the at least one second layer and the first layer.

12. The fuel conduit as recited in claim 1, wherein the thickness transition location is a first thickness transition location and further comprising a second thickness transition location, the minimum radius of curvature location arranged between the first thickness transition location and the second thickness transition location.

13. A fuel injector for a gas turbine engine, comprising:
   a feed arm with a fuel inlet;
   a fuel conduit for the fuel injector, comprising:
      a coiled tube, having:
         a longitudinal segment arranged to extend along a flow axis; and
         a coil segment in fluid communication with the longitudinal segment, the coil segment coiled about the flow axis,
         wherein the coil segment has a plurality of radial segments, including an inlet radial segment, an outlet radial segment, and at least one intermediate radial segment, that each extend about the flow axis,
         wherein a wall thickness of at least one of the longitudinal segment and the coil segment increases at a thickness transition location offset from a minimum radius of curvature location defined along the fuel conduit to limit stress in the fuel conduit,
         wherein the minimum radius of curvature location has a wall thickness that is greater than the wall thickness of the coil segment, the minimum radius of curvature location being a location where a rate of change in a direction of the flow axis is the greatest between the longitudinal segment and coil segment, and
      wherein the flow axis extends parallel along a longitudinal direction of a central axis of at least one coil of the coil segment;
   the fuel conduit coupled to the feed arm and in fluid communication with the fuel inlet; and
   a fuel nozzle in fluid communication with the fuel inlet through the fuel conduit, wherein the thickness transition location is a first thickness transition location and the fuel conduit includes a second thickness transition location, the minimum radius of curvature location arranged between the first and second thickness transition locations, the wall thickness of the at least one of the longitudinal segment and the coil segment increasing from both the first and second thickness transition locations along the fuel conduit toward the minimum radius of curvature location.

14. The fuel injector as recited in claim 13, wherein the first and second thickness transition locations are located on a common end of the fuel conduit.

15. The fuel injector as recited in claim 13, wherein the first and second thickness transition locations are located on opposite ends of the fuel conduit.

16. A method of making a fuel injector for a gas turbine engine, comprising:
- forming a longitudinal segment of a fuel conduit;
- forming a coil segment of the fuel conduit; and
- establishing fluid communication between the longitudinal segment and the coil segment along a flow axis, the longitudinal segment arranged along the flow axis and the coil segment extending about the flow axis;
- wherein forming at least one of the longitudinal segment and the coil segment of the fuel conduit includes defining a thickness transition location and a minimum radius of curvature location offset from the thickness transition location along the at least one of the longitudinal segment and coil segment, and increasing a wall thickness of the at least one of the longitudinal segment and coil segment between the the minimum radius of curvature segment and the least one of the longitudinal segment and coil segment,
- wherein the minimum radius of curvature segment has a wall thickness that is greater than the wall thickness of the coil segment, the minimum radius of curvature segment being a location where a rate of change in a direction of the flow axis is the greatest between the longitudinal segment and coil segment, and
- wherein the flow axis extends parallel along a longitudinal direction of a central axis of at least one coil of the coil segment.

17. The method as recited in claim 16, wherein establishing fluid communication includes coupling an adapter having the longitudinal segment to the coil segment, the minimum radius of curvature location arranged along the adapter and between the longitudinal and coil segments.

18. The method as recited in claim 16, wherein establishing fluid communication includes bending a continuous length of tube having a tapered wall thickness to form the at least one of the longitudinal and coil segments.

19. The method as recited in claim 16, wherein forming the at least one of the longitudinal segment and the coil segment includes fusing at least one second layer to a first layer using an additive manufacturing technique.

* * * * *